Dec. 2, 1969  S. D. POOL ET AL  3,481,122
GROUND SPEED CONTROL
Filed Oct. 23, 1967  4 Sheets-Sheet 1
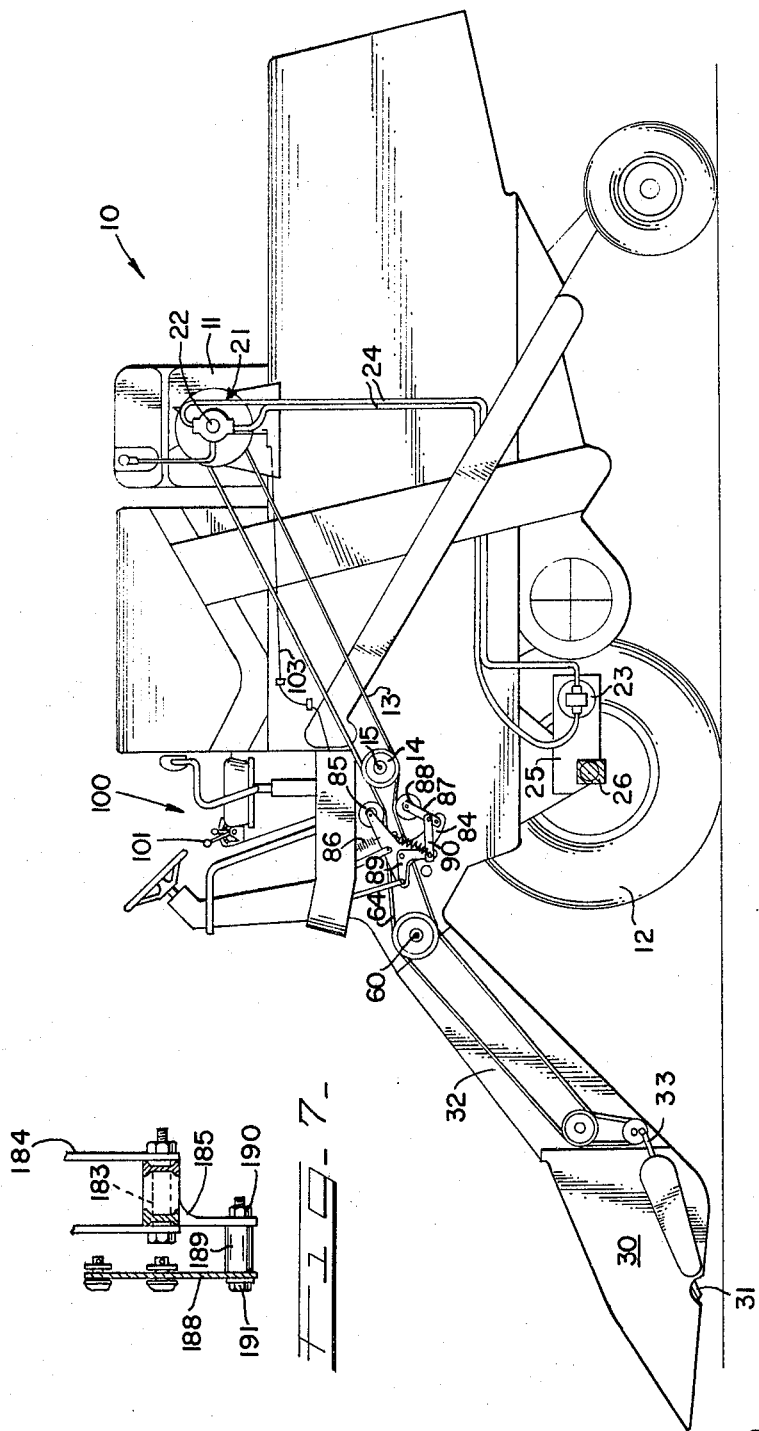
INVENTORS
STUART D. POOL
EDWARD SVEREIKA
TOMMY A. MIDDLESWORTH
BY *[signature]* ATT'Y.

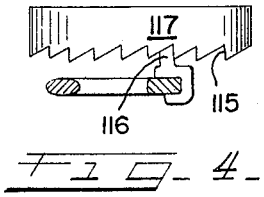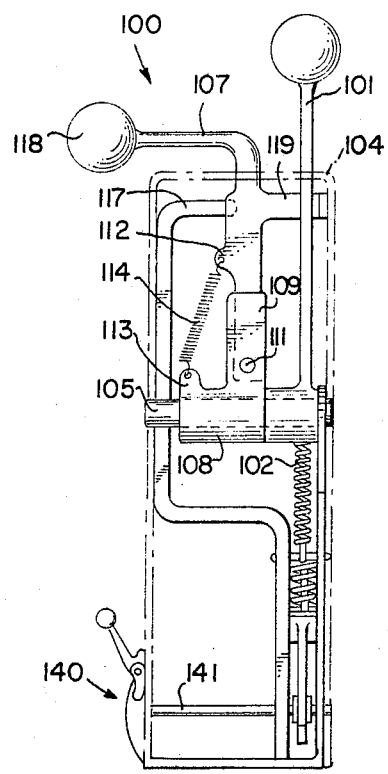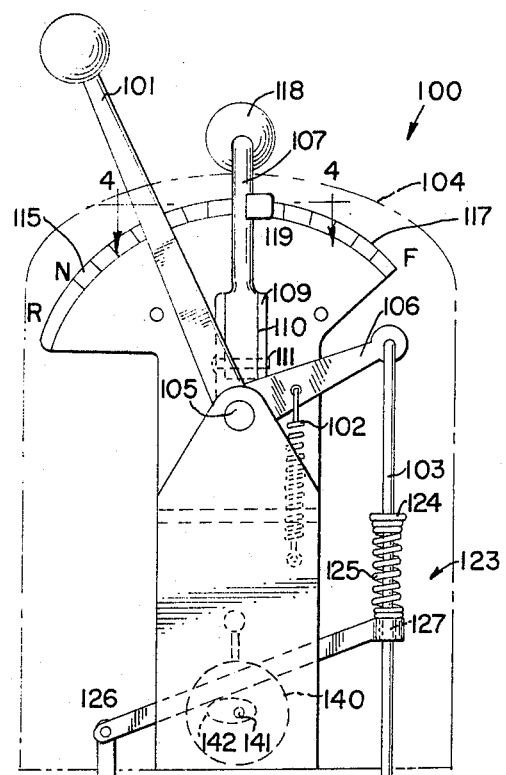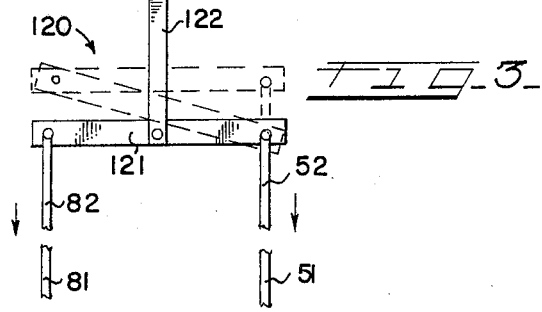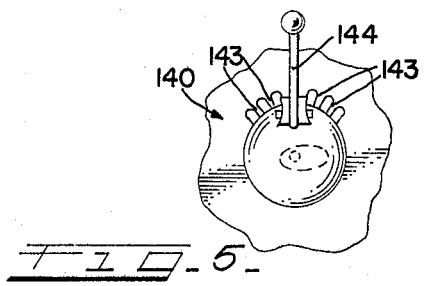

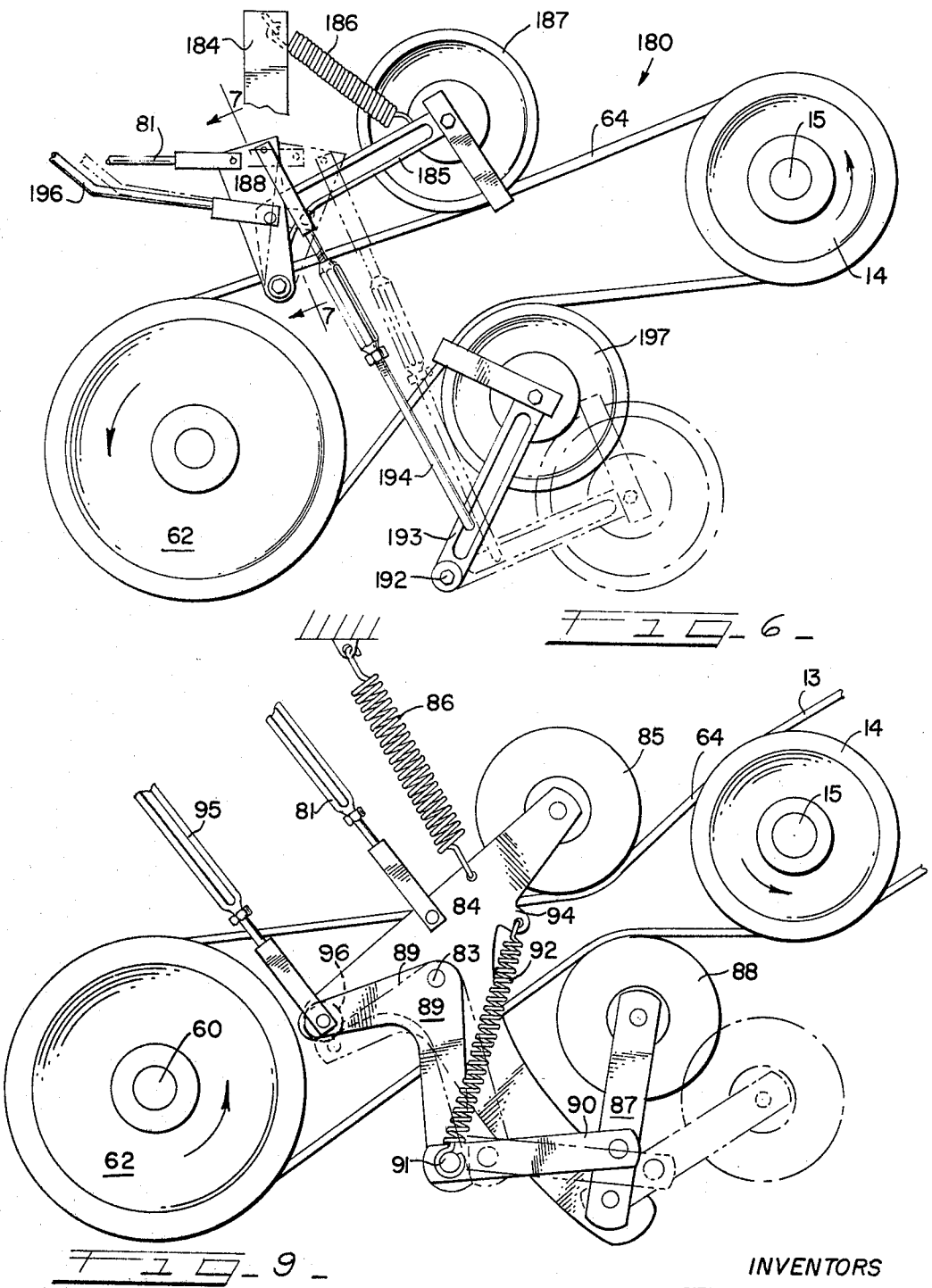

Dec. 2, 1969     S. D. POOL ET AL     3,481,122
GROUND SPEED CONTROL
Filed Oct. 23, 1967     4 Sheets-Sheet 4
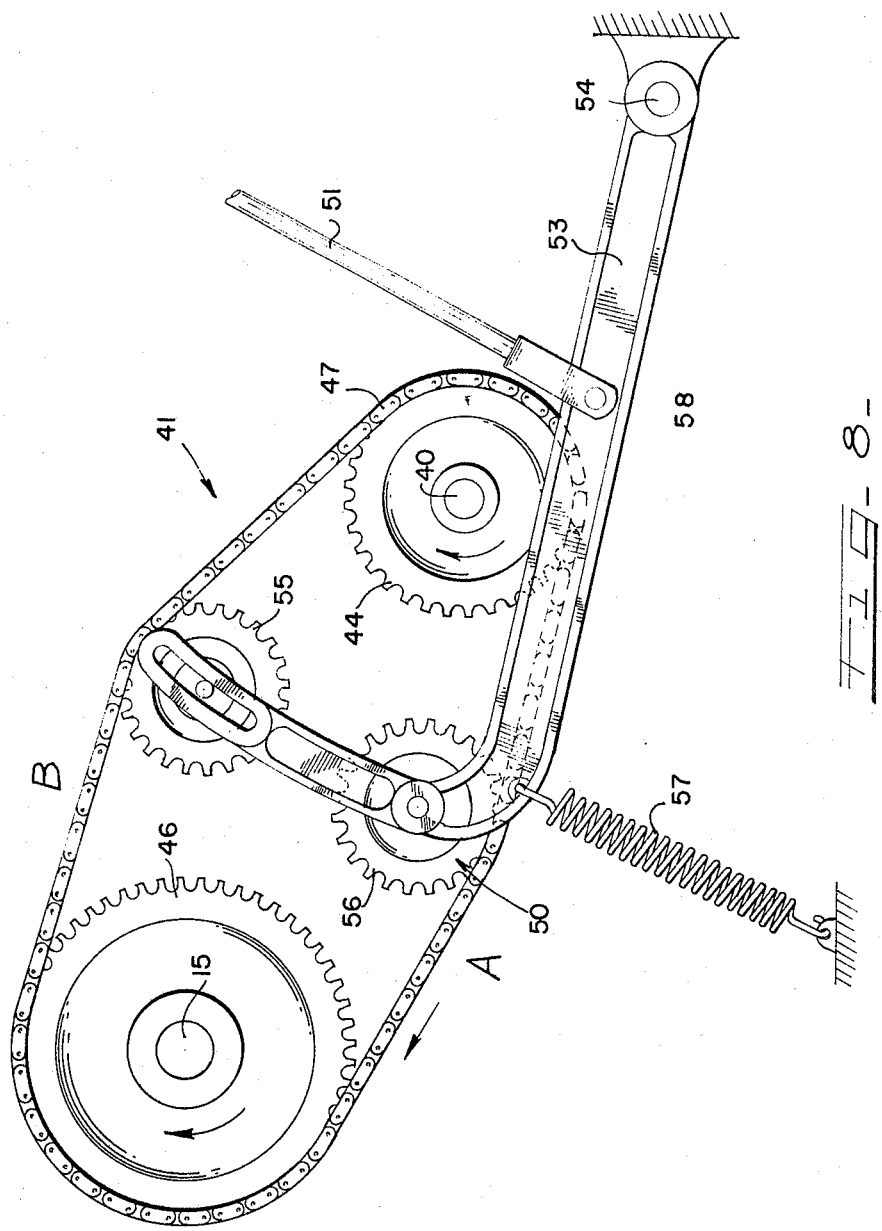
INVENTORS
STUART D. POOL
EDWARD SVEREIKA
TOMMY A. MIDDLESWORTH

United States Patent Office 3,481,122
Patented Dec. 2, 1969

3,481,122
GROUND SPEED CONTROL
Stuart D. Pool, Naperville, Edward Svereika, Chicago, and Tommy A. Middlesworth, Hinsdale, Ill., assignors to International Harvester Company, Chicago, Ill., a corporation of Delaware
Filed Oct. 23, 1967, Ser. No. 677,443
Int. Cl. A01d 69/06
U.S. Cl. 56—21                                       15 Claims

ABSTRACT OF THE DISCLOSURE

An automatic ground speed control apparatus for a harvesting machine that senses the torque required to feed material into the harvester and the torque required to process the material and regulates the ground speed in response to the algebraic sum of measured torques.

BACKGROUND OF THE INVENTION

This invention pertains to a harvesting machine of the type that gathers, conveys and processes the crop while in the field and more particularly to means for controlling the ground speed of such a harvester.

The prior art discloses speed control devices for combines that sense the torque of one component of the combine and regulate the ground speed in response thereto. Devices such as this can be found in the patents to Pasturczak No. 2,639,569 of May 26, 1953 and Anderson No. 3,073,099 of Jan. 15, 1963. The major problem with devices as shown in the prior art is that they result in sharp changes in the ground speed of the harvester since the torque required at a particular point is neither anticipated nor remembered. If an unusually sparse spot in the field is encountered, the groundspeed will be sharply increased and if an unusually dense spot is encountered the ground speed will be sharply reduced. In other words, the ground speed of the harvester depends solely upon the torque requirement at a particular point in the harvester and no consideration is given to the immediately preceding or future torque requirements. In the prior art devices minor variations in the crop stand can result in abrupt changes in the ground speed causing inefficiencies in the harvester.

SUMMARY

The general purpose of this invention is to provide an apparatus for automatically controlling the ground speed of a harvester which embraces all the advantages of the similarly employed prior art devices and possesses none of the aforedescribed disadvantages. To attain this, the present invention contemplates a unique system wherein the torque requirements of the harvesting machine are sensed at two locations. These readings are algebraically summed and the ground speed of the harvester is adjusted as a function of this total. In the embodiment of applicants' device disclosed herein, the torque is sensed at the feeder and platform drive and also at the threshing cylinder. If a greater than normal amount of crop is encountered an increased torque requirement will be sensed at the feeder and platform drive and a reduction in the harvester ground speed will be effected. The same material that caused the initial increased torque requirements at the feeder and platform drive would after a short time interval, encounter the threshing cylinder. This material will likewise cause an increase torque requirement at the threshing cylinder and providing the torque requirements in the feeder and platform drive have not changed, a further reduction in the ground speed of the harvester will be effected. If, however, at the time the initial material is encountered by the threshing cylinder the torque requirements at the feeder and platform drive have been reduced, then the ground speed would not be further reduced but rather would be held at the first reduced level until the torque requirements of the threshing cylinder returned to normal. Thus in applicants' device an algebraic sum of the torque requirements between multiple points is taken within the harvester and sharp variations in the ground speed are avoided. A harvesting machine is capable of handling a change in the feed rate for short periods of time as a result of its characteristic of leveling the material by attrition, and thus, momentary increases or decreases in the material fed to the harvester are not critical. If, however, the material feed rate is increased over a long period of time, then the efficiency of the combine is drastically reduced. Thus, with applicants' device the ground speed of the harvester is automatically controlled as a function of the algebraic sum of torque requirements at several points in the harvesting machine and the feed rate of material through the machine is held constant at an optimum.

BRIEF DESCRIPTION OF THE DRAWINGS

FIGURE 1 is a side view of a combine harvester having applicants' speed control apparatus mounted thereon;
FIGURE 2 is a front view of a manual control quadrant and preset linkage for the control device;
FIGURE 3 is a side view of the quadrant seen in FIGURE 2;
FIGURE 4 is a cross sectional view taken along lines 4—4 of FIGURE 3;
FIGURE 5 is an enlarged view of the adjustable pivot seen in FIGURES 2 and 3;
FIGURE 6 is a layout of the torque sensing means for the feeder and platform drive;
FIGURE 7 is a cross sectional view taken along lines 7—7 of FIGURE 6;
FIGURE 8 is a layout of the threshing cylinder torque sensing means; and
FIGURE 9 is another embodiment of a torque sensing means for the feeder and platform drive.

DESCRIPTION OF THE PREFERRED EMBODIMENTS

Referring now to the drawings wherein like reference characters designate like or corresponding parts throughout the several views, there is shown in FIGURE 1 a combine harvester designated 10 having an engine or power source 11 and traction means or drive wheels 12. Extending forwardly from the harvester 10 is a crop gathering means including a platform 30, a sickle 31 and a crop feeding means or feeder 32. In FIGURE 1, the left side drive wheel has been cut away so that the transmission 25 can be seen. A variable ratio drive means including a hydrostatic transmission 21 is provided between the power source 11 and the traction means 12. It should be understood that a conventional mechanical drive train could be used for this purpose. The hydrostatic transmission 21 includes a hydraulic pump 22 driven by the power source 11, an hydraulic motor 23 connected to and driving the input shaft of the mechanical transmission 25, and conduits 24 connecting the hydraulic pump 22 and motor 23. The drive axle 26 connects the mechanical transmission 25 to the traction means 12. The control means 100 for the variable ratio drive means are located on the operator's platform of the combine harvester 10. As can be sen in FIGURE 1 an operator's speed control lever 101 is connected through drive control linkage 103 to the hydraulic motor 23 of the hydrostatic transmission 21. In a hydrostatic transmission such as this, the hydraulic motor 23 can run at any speed within its range and thus by combining the hydrostatic transmission 21 with the mechanical transmission 25, the power source 11 can be operated at optimum conditions and the forward or reverse speed of the combine harvester has infinite adjustment within its range. For a more complete disclosure of a hydrostatic transmission, reference is hereby made to the U.S. Patent to Jedrzykowski No. 3,078,656 of Feb. 26, 1963.

As can be seen in FIGURES 1 and 9, the power source 11 is connected by a belt 13 to a sheave 14 secured to the beater shaft 15. The beater shaft 15 extends transverse of the harvester 10 and it is journaled in both side walls. A beater (not shown) is carried by the beater shaft between the side walls of the harvester.

In FIGURE 1, the beater shaft 15 is seen from the left side of the harvester and in FIGURE 8, the beater shaft 15 is seen as it appears on the right side of the harvester. Referring now to FIGURE 8 wherein a sprocket 46 is shown secured to the beater shaft 15, it should be understood that the sprocket 46 is located adjacent the right side wall of the harvester in a manner similar to the sheave 14 which is located adjacent the left side wall of the harvester as seen in FIGURE 1. A crop processing driver 40 is journaled in the side walls of the combine and has secured thereto sprocket 44 in alignment with sprocket 46. It should be noted that the crop processing driver 40 carries the threshing cylinder (not shown) between the side walls of the combine. A chain 47 connects sprocket 46 to sprocket 44, and the sprockets 44 and 46 along with the chain 47 constitute the first drive means designated 41. First drive means 41 function to transmit rotary motion from the beater shaft 15 to the crop processing driver 40.

A first torque sensing means 50 is provided to sense the torque in chain 47 and includes a curved arm 53 mounted for pivotal movement about pivot 54. The curved arm 53 carries a first idler 55 and a second idler 56. The arm 53 is biased by spring 57 to pivot in a counterclockwise direction about pivot 54 as seen in FIGURE 8. Sprockets 44 and 46 as seen in FIGURE 8 rotate in a clockwise direction and thus the chain side designated A in FIGURE 8 is the tight side, and the chain side designated B is the slack side. The first idler 55 is arranged to engage the slack side B of the chain 47 and the second idler 56 is arranged to engage the tight side A of the chain 47. As the torque requirements of the crop-processing driver increase the tight side of the chain in engagement with the second idler 56 tends to pivot the arm 53 in a clockwise direction in opposition to the counterclockwise bias of spring 57. A reciprocating output link 51 is connected at one end to the arm 53 by a pivot 58 and has a free end portion 52 as seen in FIGURE 3. With this torque sensing means, the tension in the chain 47 is indicated by the position of the end portion 52 of the reciprocating output link 51.

Referring now to FIGURES 1 and 9 there is shown the feeder and platform driver 60' On conventional harvesters there is a chain and slot type undershot conveyor (not shown) housed in the feeder 32 and mechanical means 33 for driving the sickle 31. The second drive means 61 comprises a pulley 62 secured to the feeder and platform driver 60, a sheave 14 carried by the beater shaft 15 and a belt 64 connecting sheave 14 and pulley 62.

One embodiment of the second torque sensing means 80 is shown in FIGURES 1 and 9. A pivot shaft 83 is carried by the bellcrank 84. The ballcrank 84 is pivotally supported from the side wall of the combine at 96. A first idler 85 is rotatably carried by one arm of the bellcrank lever 84 and functions to take up slack in the loose side of the belt 64. A first spring 86 is connected at one end to the ballcrank lever and fixed at its other end such that it tends to bias bellcrank lever 84 in a counterclockwise direction, An arm 87 is pivotally connected to the other arm of the bellcrank lever 84 and pivotally supports a second idler 88 at its free end. The second idler 88 is adapted to engage the tight side of belt 64 and exert pressure in a direction opposed to the tension in this side of the belt. A second bellcrank lever 89 is pivotally mounted on the pivot shaft 83. A link 90 is pivotally connected at one end to an arm of bellcrank lever 89 at pivot 91 and at its other end to arm 87. A second spring 92 is anchored on a tab 94 carried by the bellcrank lever 84 and at its other end to the pivot 91. A reciprocating output link 81 having an end portion 82 seen in FIGURE 3 is pivotally connected to the bellcrank lever 84. A clutch control link 95 is pivotally connected to the bellcrank lever 89. The bellcrank lever 89 as shown in the full line position in FIGURE 9 illustrates the engaged position of the clutch and the broken line position illustrates the disengaged position of the clutch.

With the clutch in the engaged position spring 86 biases the bellcrank level 84 toward a counterclockwise rotation about pivot point 96. A second idler 88 is thus caused to exert a pressure on the tight side of belt 64 in opposition to the tendency of the belt to assume a tangent position with respect to sheave 14 and pulley 62. During engagement of the clutch, spring 92 biases the second idler 88 in a direction opposed to the bias caused by spring 86. However the action of second spring 92 is resisted by the clutch control link 95 which is positively held in the clutch engaged position.

As the torque requirements for the feeder and platform driver 60 increase, the tight side of belt 64 will be under greater tension and move closer to the tangent line between sheave 14 and pulley 62. This will cause the second idler 88 and the bellcrank lever 84 to pivot in a clockwise direction in opposition to the first spring 86. The clockwise rotation of bellcrank lever 84 will cause a corresponding movement in the reciprocating output link 81 and its end portion 82.

Referring now to FIGURES 6 and 7 another embodiment of second torque sensing means 180 will be described. This torque sensing means is illustrated for use with the feeder and platform driver. A pivot shaft 183 is carried by a pair of supports 184 which are in turn rigidly carried by the side wall of the harvester. A bellcrank lever 185 is pivotally mounted on the pivot shaft 183. A first idler 187 is rotatably mounted on one arm of bellcrank lever 185 and a spring 186 is connected to this arm and also to the supports 184 and functions to rotatably bias bellcrank lever 185 in a counterclockwise direction. An arm 188 is connected to the other arm of bellcrank lever 185. A sleeve 189 is provided for spacing arm 188 from the adjacent arm of the bellcrank lever 185. A bolt 191 extends through the arm 188, the sleeve 189 and the adjacent arm of the bellcrank lever 185 and the entire assembly is locked together by a nut 190.

A second pivot shaft 192 supported by the side wall of the harvester rotatably mounts an arm 193. An adjustable link 194 connects arm 193 to arm 188. A second idler 197 is rotatably carried by the free end of arm 193 and is adapted to engage the tight side of belt 64. A reciprocating output link 181 having an end portion 82 and a clutch control link 196 are pivotally connected to the arm 188. The first idler 187 engages the slack side of belt 64 to take up the normal slack in the belt drive. Spring 186 biases bellcrank lever 185 in a counterclockwise direction and thereby tends to pivot arm 188 in a counterclockwise direction. The counterclockwise rotation of arm 188 is transmitted through link 194 to arm 183 causing the second idler 197 into biased engagement with the tight side of belt 64. The tight side of belt 64 tends to assume a tangent position with respect to sheave 14 and pulley 62 in opposition to the idler 197. As the torque requirements of pulley 62 increases, the tension in the tight side of belt 64 increases correspondingly and the second idler 197 is moved toward this broken line position as seen in FIGURE 6. The movement of the second idler 197 is transmitted through arm 193, link 194 and arm 188 to the reciprocating output link 181.

In FIGURE 6 the clutch control link 196 is shown in full lines to be in the engaged position and in broken lines to be in the disengaged position. As the clutch control link 196 is moved from the full line position to the broken line position arm 188 is pivoted clockwise and this movement is transmitted through link 194 to link 193 which causes the second idler 197 to move out of engagement with the belt 64 thus relieving the tension in belt 64 and rendering the second drive means inoperative. When the clutch is disengaged because of plugging, pickup of rocks, or other troublesome conditions, the output link 81 is shifted to the right, as seen in FIGURE 6, which causes the forward speed of the combine to be reduced. It is of course desirable to reduce the forward speed when trouble is encountered and thus declutching the feeder drive automatically results in a desirable reduction in forward speed.

Referring now to FIGURES 2 through 5 inclusive, the control means 100 and the integrating means 120 will be described. The control means 100 includes a casing 104 that is mounted adjacent the operator's platform convenient to the operator. A pivot shaft 105 is carried by the casing 104 and the means upon which the operator's speed control lever 101 is rotatably mounted. The operator's speed control lever 101 includes an arm 106 that is pivotally connected to the drive control linkage 103. Yieldable means such as a spring 102 is connected to the arm 106 and to the casing 104 such that the operator's speed control lever 101 is biased toward the fast position. As the operator's speed control lever 101 is adjusted the swashplate of the hydraulic pump 22 is controlled through the drive control linkage 103. As a result of the yieldable means 102 if there were nothing to restrict the operator's speed control lever 101, it would move to the fast end of the quadrant 117. There are, however, several means of preventing the operator's speed control lever 101 from moving to the full fast position.

The first of these restraining means is the maximum speed control lever 107 that includes a hub 108 pivotally mounted on the pivot shaft 105. The hub 108 includes a radial projection 109 having a groove 110 formed therein. A handle 118 that fits into the groove 110 is connected to the hub 108 by a pin 111. The handle 118 is free to pivot about pin 111 in one direction however its pivotable movement in the opposite direction is restrained by the bottom of the groove. A spring 114 is connected at one end of a tab 112 on the handle 118 and at its other end to a tab 113 on the hub 108. The spring 114 biases the handle 118 of the maximum speed control lever 107 against the bottom of the groove 110. The handle 118 has a pawl 116 (see FIGURE 4) secured thereto that is adapted to engage a ratchet 115 carried on the quadrant 117 of the casing 104. A stop 119 is carried on the handle 118 and projects into the path of the operator's speed control lever 101.

The position of the maximum speed control lever 107 can be adjusted by pivoting the handle 118 against the action of the spring 114 such that the pawl 116 is disengaged from the ratchet 115. With the ratchet and pawl out of engagement the maximum speed control lever 107 can be pivoted about the pivot shaft 105 and be set at any position along the quadrant 117. Upon releasing the handle 118 spring 114 causes the pawl 116 to engage the ratchet 115 and retain the maximum speed control lever 107 in the selected position. With the maximum control lever 107 in its selected position the stop 119 will prevent the operator's speed control lever 101 from moving to a position beyond the stop 119. Thus as the spring 102 biases the operator's speed control lever 101 toward the fast position its maximum position will be controlled by the stop 119.

The second means resisting the movement of the operator's speed control lever 101 towards the fast position is the integrating means 120. The integrating means 120 include an integrating link 121 pivotally connected to the end portion 52 of the reciprocating output link 51 and the end portion 82 of the reciprocating output link 81. The resultant link 122 is pivotally connected to the integrating link 122 between the reciprocating output links.

A link 126 is pivotally connected at one end to the resultant link 122 and has an opening 127 formed in its other end. The drive control linkage 103 extends through the opening 127. A shoulder 124 is secured to the drive control linkage 103 above the link 126 and a spring 125 surrounds the drive control linkage 103 in engagement with the shoulder 124 and also the link 126.

A feed control lever 140 forms a pivot or fulcrum for link 126. The feed control lever 140 has a pivot shaft 141 that is journaled in the casing 104. An eccentric cam 142 is carried on the pivot shaft 141 and is located such that the link 126 pivots about the eccentric cam 142. As can be best seen in FIGURE 5 a series of notches 143 are formed in the surface of casing 104 and a locking lever 144 carried by the feed control lever are adapted to lock the feed control lever in an adjusted position relative to the casing 104. By adjusting the feed control lever 140 the pivot point along link 126 is adjusted and in effect controls the sensitivity of the system.

Referring now to FIGURE 3 the operation of the integrating means 120 will be discussed. The arrows adjacent the end portions 52 and 82 of the reciprocating output links indicate the direction that these links will move in release to a high torque load. Considering the full line position of the end portions 52 and 82 and the integrating link 121 to be the position of these members would assume when there are high torque requirements in both the feeder platform and the processing unit. If the torque requirements are then reduced in the feeder platform the end portion 82 would move in a direction opposite to the arrow toward the broken line position shown in FIGURE 3. If the torque requirements at the processing unit have not changed then the integrating link 121 will assume the diagonal position shown in broken lines. In this position the pivotable connection between the integrating link 121 and the resultant link 122 has moved upwardly a distance less than the distance moved by reciprocating output link 81. This movement of the resultant ling 122 causes the link 126 to pivot in a clockwise direction about the eccentric cam 142 causing the end of link 126 upon which the spring 125 bears to move downwardly and thus relieve tension in the spring 125. The tension in spring 125 acts to move the operator's speed control lever 101 toward the slow position in opposition to the action of the spring 102 which tends to move the operator's speed control lever 101 towards the fast position. Thus when tension in spring 125 is reduced the spring 102 will exert more influence upon the position of the operator's speed control lever 101 causing it to move towards a faster position. Thus it is seen that the upward movement of the reciprocating output link 81 in response to the lighter torque requirements in the feeder of the harvester has caused an increase in the ground speed of the harvester.

If the torque requirements in the cylinder or processing unit is likewise reduced, then the end portion 52 of the reciprocating output link 51 will also be moved upwardly toward the broken line position as seen in FIGURE 3. This will place the integrating link 121 in a position parallel to its full line position at an upper location. The pivotable connection between the integrating link 121 and the resulting link 122 will be moved upwardly a distance equal to the distance moved by the reciprocating output links 51 and 81. This of course will cause a greater pivotable movement of link 126 about the eccentric cam 142 than previously described and a corresponding reduced tension in the spring 125. As a result of this greater reduction in spring tension the ground speed of the combine will be increased over that in the above example.

It should be understood of course that the foregoing disclosure relates to only preferred embodiments of the invention and that numerous modifications or alterations may be made therein without departing from the spirit and scope of the invention.

What is claimed is:

1. A harvester having a power source, traction means for advancing said harvester over a field, variable ratio drive means connecting said traction means to said power source; a crop processing driver carried by the harvester, first drive means connecting said crop processing driver to said power source, first torque sensing means for monitoring the torque requirements of said crop-processing driver; a feeder and platform driver carried by said harvester and adapted to receive field crops as the harvester advances and to advance the crops to the processing station, second drive means connecting said feeder and platform driver to said power source, second torque sensing means for monitoring the torque requirements of said feeder and platform driver; integrating means for algebraically summing said torque requirements; control means connecting said integrating means and said variable ratio drive means such that the ground speed of the harvester will be inversely affected by a change in the algebraic sum of said torque requirements.

2. The invention as set forth in claim 1 wherein said control means connecting said integrating means and said variable ratio drive means includes an adjustable sensitivity control for regulating the level at which feedback begins.

3. The invention as set forth in claim 1 wherein said second drive means includes a clutch, said clutch being connected to said second torque sensing means such that when the clutch is disengaged it indicates a high degree of torque to said torque sensing means causing a reduction in forward speed of the harvester.

4. The invention as set forth in claim 1 wherein said control means includes an operator's speed control lever that is connected directly to said variable ratio drive means and wherein said control means further includes yieldable means to permit overriding of the integrating means with said speed control lever.

5. The invention as set forth in claim 1 wherein said variable ratio drive means includes a hydrostatic transmission permitting output drive of infinitely variable ratios within its range.

6. The invention as set forth in claim 5 wherein said control means includes an operator's speed control lever connected directly to said hydrostatic transmission and wherein said control means further includes yieldable means to permit overriding by the operator of the integrating means with the speed control lever.

7. The invention as set forth in claim 6 wherein said speed control lever is biased to move toward the fast position and wherein an adjustable maximum speed restraining means is provided to limit the movement of said speed control lever toward the fast position.

8. The invention as set forth in claim 1 wherein said control means includes a pivoted speed control lever that is connected through a drive control link directly to said variable ratio drive means, means biasing said speed control lever toward the fast position; said first and second torque sensing means each including a reciprocating output link having end portions and arranged generally parallel to each other, an integrating link arranged generally transverse to said output links, said end portions pivotally connected to said integrating link, a resultant link attached at one end to said integrating link between said output links and at its other end to a pivoted link, said pivoted link associated with said drive control link such that when said output links indicate to said resultant link that there is an increase in measured torque said speed control lever will be moved toward the slow position in opposition to said biasing means.

9. A harvester having a power source, traction means for advancing said harvester over a field, variable ratio drive means connecting said traction means to said power source;
a first driver carried by said harvester, first drive means connecting said driver to said power source, first torque sensing means for monitoring the torque requirements of said first driver;
a second driver carried by said harvester, second drive means connecting said second driver to said power source, second torque sensing means for monitoring the torque requirements of said second driver;
integrating means for algebraically summing said torque requirements;
control means connecting said integrating means and said variable ratio drive means such that the ground speed of the harvester will be inversely affected by a change in the algebraic sum of said torque requirements.

10. The invention as set forth in claim 9, wherein said control means includes an operator's feed control lever that is connected directly to said variable ratio drive means and wherein said control means further includes yieldable means to permit overriding of the integrating means with said speed control lever.

11. The invention as set forth in claim 9 wherein said variable ratio drive means includes a hydrostatic transmission permitting output drive of infinitely variable ratios within its range.

12. The invention as set forth in claim 11 wherein said control means includes an operator's speed control lever connected directly to said hydrostatic transmission and wherein said control means includes yieldable means to permit overriding by the operator of the integrating means with the speed control lever.

13. The invention as set forth in claim 12 wherein said speed control lever is biased to move toward the fast position and wherein an adjustable maximum speed restraining means is provided to limit the movement of said control lever toward the fast position.

14. The invention as set forth in claim 9 wherein said control means includes a pivoted speed control lever that is connected by a drive control link directly to the variable ratio drive means, means biasing said speed control lever toward the fast position; said first and second torque sensing means each including a reciprocating output link having end portions and arranged generally parallel to each other, an integrating link arranged generally transverse to said output links, said end portions pivotally connected to said integrating link, a resultant link attached at one end to said integrating link between said output link and at its other end to a pivoted link, said pivoted link associated with said drive control link such that when said output link indicates to said resultant link that there is an increase in measured torque said speed control lever will be moved toward the slow position in opposition to said biasing means.

15. The invention as set forth in claim 9 wherein said control means connecting said integrating means and said variable ratio drive means includes an adjustable sensitivity control for regulating the level at which feedback begins.

References Cited

UNITED STATES PATENTS

| | | | |
|---|---|---|---|
| 2,611,227 | 9/1952 | Keller | 56—20 |
| 2,639,569 | 5/1953 | Pasturczak | 56—20 |
| 2,749,696 | 6/1956 | Innes | 56—21 |
| 3,093,946 | 6/1963 | Pitt et al. | 56—20 |
| 3,138,908 | 6/1964 | Budzich | 56—20 |
| 3,073,099 | 1/1963 | Anderson | 56—20 |

LOUIS G. MANCENE, Primary Examiner

J. W. MITCHELL, Assistant Examiner